United States Patent [19]
Cheal et al.

[11] 3,886,549
[45] May 27, 1975

[54] INTRUSION DETECTION SYSTEM

[75] Inventors: James Cheal, Plymouth; Vincent J. McHenry, Farmington, both of Mich.

[73] Assignee: Omni Spectra, Inc., Farmington, Mich.

[22] Filed: June 7, 1973

[21] Appl. No.: 367,700

Related U.S. Application Data

[63] Continuation-in-part of Ser. No. 237,745, March 24, 1972, abandoned.

[52] U.S. Cl. ............ 343/7.7; 340/258 A; 343/5 PD; 343/781
[51] Int. Cl. .... G01s 9/42; G08b 13/00; H01q 19/14
[58] Field of Search ....... 340/258 A; 343/5 PD, 7.7, 343/782, 840, 781

[56] References Cited
UNITED STATES PATENTS

| | | | |
|---|---|---|---|
| 2,645,769 | 7/1953 | Roberts | 343/9 X |
| 3,071,770 | 1/1963 | Wilkes | 343/840 X |
| 3,254,342 | 5/1966 | Miller | 343/781 |
| 3,512,155 | 5/1970 | Bloice | 343/5 PD |
| 3,618,083 | 11/1971 | Burley et al. | 343/5 PD |
| 3,696,368 | 10/1972 | Kauffman | 340/258 A |

*Primary Examiner*—Malcolm F. Hubler
*Attorney, Agent, or Firm*—Harness, Dickey & Pierce

[57] ABSTRACT

An intrusion detection system including a microwave transmitter for generating plane polarized microwave energy, a microwave antenna which is adapted for radiation and reception of the microwave energy in a predetermined pattern, a duplexer for converting the plane polarized energy from the transmitter into circularly polarized energy for radiation from the antenna and for converting received circularly polarized energy reflected from an object into plane polarized energy having an electric field which is orthogonal to the electric field of the energy from the transmitter, a mixer for mixing the received microwave energy and a small portion of the microwave energy generated by the transmitter to provide a signal having a component representative of the doppler effect, and a receiver for detecting the doppler component to provide a signal representative thereof. The signal representative of the doppler effect is received by a signal processor which converts the signal to a square wave signal of like frequency and integrates the square wave signal to provide an integral signal which, upon attaining a predetermined level, indicates the presence of an intruder. The antenna preferably consists of a parabolic reflector and a splash plate and has identical patterns of radiation and reception so as to generally delineate the area of surveillance of the intrusion detecting system. Preferably, the splash plate is a metallic foil which is affixed to a dielectric support member and which is configured to provide the desired pattern of radiation and reception.

22 Claims, 14 Drawing Figures

Patented May 27, 1975 3,886,549
2 Sheets-Sheet 1
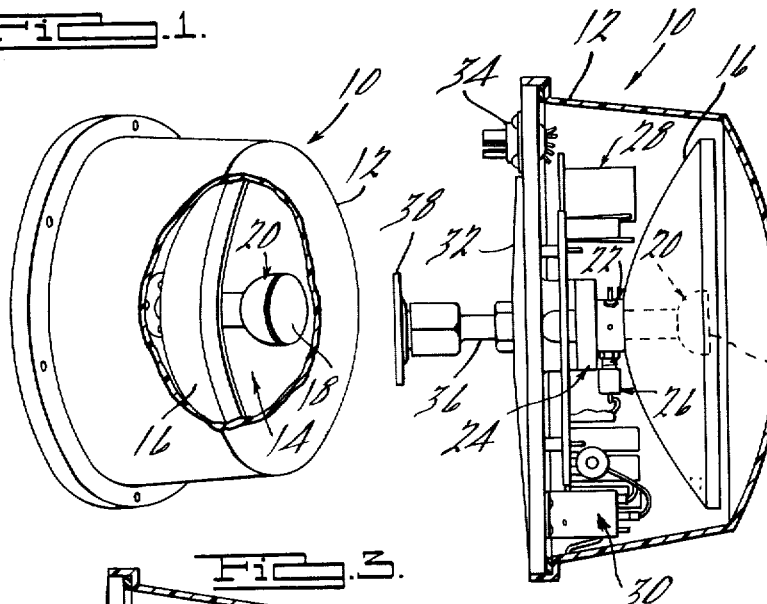

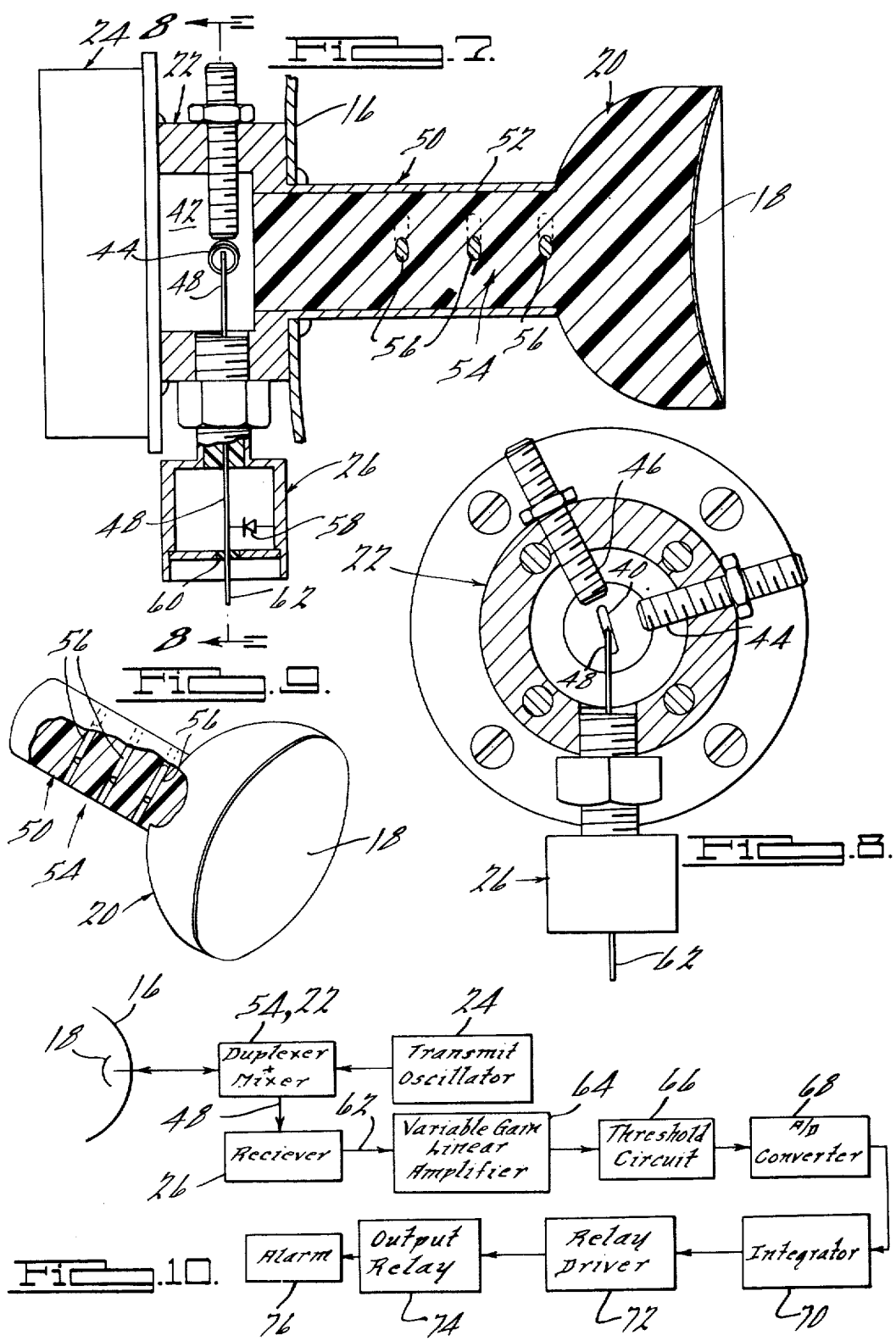

INTRUSION DETECTION SYSTEM

CROSS REFERENCE TO RELATED APPLICATION

This application is a continuation-in-part of our co-pending application Ser. No. 237,745, filed Mar. 24, 1972 now abandoned of like title and assignee.

BACKGROUND AND SUMMARY OF THE INVENTION

The present invention relates to a microwave intrusion detecting system which has a compact microwave circuit and is easily and inexpensively manufactured, and importantly, can be easily adapted by the user so as to provide a microwave radiation/reception pattern which is appropriate for the area under surveillance.

In essence, the intrusion detection system of this invention includes a transmitter for generating microwave energy, an antenna for radiating the microwave energy into an area under surveillance and for receiving microwave energy reflected from an object which has an alterable pattern of radiation and reception, a receiver for providing a signal representative of the doppler effect, and a signal processor for providing a signal which is indicative of an unwanted intrusion into the area under surveillance.

Preferably, the transmitting/receiving antenna is a reflector or dish-type antenna having a splash plate for directing microwave energy from the transmitter at the reflector to be outwardly directed by the reflector and for directing returning microwave energy impinging on the reflector to the receiver. The splash plate is preferably a metallic foil having an adhesive or other attachment means on one side of the foil for removably securing the splash plate to a dielectric support member. The splash plate has a configuration providing a desired pattern of radiation and reception which is selected in accordance with the configuration of the area under surveillance. By way of example, a circular splash plate may be used to provide an elongated elliptical pattern of substantial extension which is especially suitable for surveillance passages and hallways and for surveillance of the perimeters of a protected area. A ring-shaped splash plate or a pair of laterally spaced splash plates may be used to provide a generally circular pattern of lesser extension than the foregoing, but of greater width, which is especially suitable for protection of a wide area. A semi-circular splash plate may be used to provide a pattern having two lobes, one being elliptical of substantial extension and the other being approximately circular of lesser extension which is especially suitable for protection of a room and an adjacent passageway or hallway.

BRIEF DESCRIPTION OF THE DRAWINGS

FIG. 1 is a perspective, partially cutaway, illustration of an intrusion detection system according to the present invention;

FIG. 2 is a side view, partially in elevation and partially in cross section, of the intrusion detection system of FIG. 1;

FIG. 3 is a top view, partially in elevation and partially in cross section, of an intrusion detection system of FIG. 1;

FIGS. 4a and 4b illustrate a first splash plate configuration and a corresponding radiation/reception pattern for the intrusion detection system of FIGS. 1–3;

FIGS. 5a, 5b and 5c illustrate second and third splash plate configurations and a corresponding radiation/reception pattern for the intrusion detection system of FIGS. 1–3;

FIGS. 6a and 6b illustrate a fourth splash plate configuration and a corresponding radiation/reception pattern for the intrusion detection system of FIGS. 1–3;

FIG. 7 is a side cross sectional view of a mixer, receiver, and splash plate for the intrusion detection system of FIGS. 1–3;

FIG. 8 is an end cross sectional view of the mixer of the intrusion detection system of FIGS. 1–3;

FIG. 9 is a perspective, partially cutaway, view of the polarizer of the intrusion detection system of FIGS. 1–3; and FIG. 10 is a block diagram of the signal processor of the intrusion detection system of FIGS. 1–3.

DETAILED DESCRIPTION OF A PREFERRED EMBODIMENT

In FIG. 1, an intrusion detection system 10 is illustrated as having a radome 12 which is shown partially cut away so as to illustrate an antenna 14 which essentially comprises a parabolic dish 16 and a splash plate 18. The splash plate 18 is shown in exaggerated thickness for illustrative purposes. The splash plate 18 is fixedly supported with respect to the reflector 16 by a high density dielectric support member 20.

In FIGS. 2 and 3, the intrusion detection system 10 is seen to additionally comprise a mixer section 22, a transmitter section 24, and a receiver section 26. Also shown in FIG. 1 are the outlines of various circuit components for biasing and signal processing as indicated generally by the numeral 28. The intrusion detection system 10 is provided with a base plate 32 which is in sealing engagement with the radome 12. A switch 30 is mounted on the base plate 32 which normally engages the radome and which is adapted to automatically sound an associated alarm if disengaged from the radome 12 as when the radome 12 is removed. A sealed connector structure 34 is also mounted on the base plate 32 for accommodating the various electrical connections of the intrusion detection system 10. The intrusion detection system 10 is adjustably mountable on a wall or other support by means of a pedestal 36 and a universally connected pedestal base 38. While the form of the intrusion detection system 10 of the invention as shown is preferred since it is compact and is in convenient form, it will be appreciated that the intrusion detection system 10 may take other forms.

In FIGS. 4–6, various splash plate configurations and associated radiation-reception patterns are illustrated. More specifically, in FIG. 4a, a first splash plate 18a is illustrated having a solid circular configuration. Preferably, the splash plate 18a is a metallic foil having an adhesive backing providing removable attachment to the dielectric support member 20. The major portion of the microwave energy from the transmitter section 24 is transmitted to the splash plate 18 through the dielectric support member 20 and is reflected therefrom to the dish reflector 16. With a splash plate configuration as shown as 18a, the radiated wave is substantially focused into a definitive pattern approximately like the pattern illustrated in FIG. 4b. Note that the pattern has a length which is substantially greater than its width so that it is ideally suited for the surveillance of narrow hallways or for the surveillance of the perimeters of an enclosed area. It would be appreciated that the pattern shown in FIG. 4b is a nominal pattern and may vary, depending on variations in the manufacture of system 10 and variations in the environment of the system 10 which may include elements which influence the radiated wave to alter the nominal pattern shown in FIG. 4b.

In FIG. 5a, a second splash plate 18b is shown as having a ring or "doughnut" pattern, i.e., one with its radially inward and radially outward boundaries defined by concentric circles. The splash plate 18b of FIG. 5a provides increased width of coverage compared to that of the splash plate 18a of FIG. 4a with the axial extension, i.e., range, of coverage being substantially reduced. For example, the radiation/reception pattern provided by splash plate 18a of FIG. 4a may provide three times the surveillance range of the radiation/reception pattern provided by splash plate 18b of FIG. 5a while the width of surveillance of the former may only be one half of the latter.

In FIG. 5c, a splash plate 18c is illustrated which provides generally the same pattern as shown in FIG. 5b and which has two spaced rectangular portions each of which is affixed to an axially aligned cylindrical side wall of the dielectric support member 20. The rectangular portions of the splash plate 18c are centered about diametrically opposed locations on the top and bottom of the dielectric support member 20 and each has a circumferentially extending dimension which is substantially greater than its axially extending dimension.

In FIG. 6a, a splash plate 18d is shown having a solid semi-circular configuration. The linear edge of the splash plate 18d is perpendicularly oriented so as to provide a split radiation/reception pattern as illustrated in FIG. 6b having an enlarged lobe on one side and an elongated lobe located along the axis of the antenna 14. By way of comparative illustration, the narrow lobe may provide a surveillance range of approximately one half that of the range provided by the splash plate 18a of FIG. 4a while the side lobe may provide a surveillance range of approximately one half the narrow lobe range. It will be appreciated that the two-love configuration is ideally suited for the surveillance of a hallway and an adjoining room.

Each of the patterns shown in FIGS. 4b-6b may be adjusted for range by simply adjusting the power output of the transmitter or the gain of the receiver. Preferably, the gain of the receiver is adjustable and is calibrated in terms of range to facilitate the adaption of the intrusion detection system 10 to various surveillance areas.

In FIG. 7, a cross-sectional view of the splash plate 18, the mixer section 22, and the receiver section 26 is provided which illustrates the exceptional simplicity of the microwave circuitry providing the duplexing, mixing, and receiving functions. The microwave circuitry will be described also with reference to FIG. 8 which illustrates a front cross-sectional view of the mixer taken generally along the lines 8—8 of FIG. 7. Microwave energy is generated within the transmitter 24, for example, by biasing a microwave diode, such as an Impatt diode, so that it oscillates in the microwave range. Microwave energy is radiated from the transmitter housing through a slot-type iris or window 40 which provides plate polarized electromagnetic energy with the electric field of the energy being generally orthogonal to the elongated axis of the iris 40. The energy enters a mixing cavity 42 which has a pair of threaded adjustable tuning screws 44 and 46. A receiver probe 48 extends into the cavity 42 at a slight angle to the orthogonal axis of the electric field radiated from the iris 40. The inclination of the receiver probe 48 tends to skew the electric field with respect to an axis orthogonal to the iris 40. The presence of the tuning member 46 compensates for the effect of the skewed receiver probe 48 on the orientation of the electric field of the transmitter energy so that the electric field remains substantially aligned with an axis which is orthogonal to the iris 40. More particularly, the tuning probe 46 is aligned at the same angle with respect to the axis of the iris 40 as the probe 48 and is radially adjustable to have an equal and opposite effect on the electric field to balance the mixer cavity 42 so as to maintain the electric field orthogonal to the iris 40. In the preferred embodiment of the present invention, the receiver probe 48 and the tuning probe 46 are each skewed at an angle of 15° with respect to the elongated axis of the iris 40. The effect of the tuning probe 48 is further balanced by the radially adjustable tuning member 44 which is aligned parallel to the electric field. The tuning probe 48 further serves to match the transmitter oscillatory 24 to the antenna and antenna feed structure.

The receiver probe 48 is skewed sufficiently with respect to the axis which is orthogonal to the electric field so as to extract a small amount of the outgoing microwave energy emitted from the iris 40. As previously stated, in the preferred embodiment, the receiver probe 48 is skewed at an angle of 15° with respect to the axis of the iris 40.

Outgoing microwave energy in the mixer cavity 42 is transmitted to the splash plate 18 through a circular wave guide 50. The circular wave guide 50 receives a cylindrical portion 52 of the splash plate support member 20 which contains a polarizer 54 comprising three pins 56 which are axially spaced apart somewhat less than one-fourth of a wavelength of the operating frequency and which are aligned at an angle of 45° with respect to the outgoing electric field. The location of the pins 56 can be best seen in FIG. 9 in which the splash plate support member 20 is shown cutaway to reveal the pins 56. As can be seen in FIG. 9, the pins 56 are centrally located with respect to the cylindrical portion 52 of the splash plate support member 20 and have a length which is approximately one half of the diameter of the cylindrical portion 52. The number of pins can be increased to increase the bandwidth of the polarizer 54, however, three pins have been found to provide a suitable bandwidth. The polarizer 54 converts the plane polarized wave from the iris 40 to a circularly polarized wave comprising two components having orthogonal electric fields, with one component lagging, the other component in phase by 90°. A substantial portion of the circularly polarized wave impinges on the splash plate 18 and is reflected toward the parabolic reflector 16. It should be noted that the support member 20 has a concave face so that the splash plate 18 assumes a concave configuration which is established in accordance with the focal point of the parabolic dish 16.

Energy reflected from an object such as an intruder is shifted in phase by 180° such that the component of the outgoing circularly polarized wave which was leading in phase by 90° is consequently lagging in phase by 90°. When the reflected portion reenters the polarizer 54 by reflection from the reflector 16 onto the splash plate 18, the circularly polarized wave is converted to a plane polarized wave having an electric field which is orthogonal to the electric field of the outgoing wave. Thus, the orthogonal relationship between the outgoing and reflected wave is due to the phase reversal which occurs on reflection of the wave from an object. Consequently, the electric field of the incoming wave is substantially aligned with the receiver probe 48 such that a major portion of the received energy is coupled to the probe 48. Therefore, it can be seen that the receiver probe 48 receives a major portion of the incoming reflected wave and a small portion of the outgoing wave so that a mixing of the two waves occurs at the receiver probe 48.

When transmitted energy is reflected by a moving object, the frequency of the received energy is shifted by an amount proportional to the speed of the object. The signal resulting from the mixing of the reflected signal with the small portion of the transmitted signal has a low frequency component representative of the frequency shift which is detected at a diode 58 of the receiver 26 to provide a low frequency signal representative of the difference in the frequencies of the transmitted and received waves. For example, the diode 58 may be a Schottky barrier diode. The bandwidth of the receiver is designed to reject signals which are outside of the frequency range of interest, i.e. signals which are above or below the frequency range within which doppler signals are found which are typically caused by intruders. For example, signals that are above the bandwidth can be caused by outside interference while signals below the bandwidth may be caused by low rate power shifts. A dielectric member 60 is interposed between the receiver probe 48 and the receiver housing 26 to provide an AC block whereby only the low frequency doppler signals will appear at the exposed end portion 62 of the receiver probe 48.

The receiver is also sensitive to amplitude changes caused by the moving object, for example, due to a multipath effect. In this regard, an object moving generally traversely of the central axis of radiation/reception pattern of the intrusion detection system 10 will return microwave energy to the receiver 26 over more than a single path thereby resulting in the reinforcement and the cancellation of the received energy at the intrusion detection system 10 over all paths as the object traverses the pattern which will provide amplitude variations in the signal from the receiver 22 which are within the bandwidth of the receiver. This effect is especially prevalent at long ranges since the receiver is not operating in a saturated condition. The amplitude modulated signal obtained thereby is also indicative of an intrusion, and consequently, the capability of the intrusion detection system 10 is enhanced due to its amplitude modulation seisitivity.

It will be appreciated that the components of the mixer section 22, in combination with the polarizer 54, also provide the duplexing function. More specifically, the orientation of the probe 48 and the orientation of the transmitter iris 40 provides duplexing as well as mixing since the orientations are responsible for providing substantial signal isolation between the transmitter energy and the reflected energy, and also serve to mix the transmitter energy with a small portion of the reflected energy.

It should be noted that many of the various component parts of the duplexer, mixer, transmitter, and receiver are basically cylindrical parts so that they may be easily fabricated at low cost on automatic screw machines.

In FIG. 10, the processing circuit for the intrusion detection system 10 is shown in block diagram. In the figure, the parabolic reflector 16, the splash plate 18, the duplexer and mixer sections which include the components at 54 and 22, the transmitter section 24, and the receiver section 26, as previously described, are shown. The output from the receiver on line 62 is received by a linear amplifier 64 which has a variable gain control to provide range adjustment. Preferably, the variable gain control is calibrated in range to facilitate the set-up of the intrusion detection system 10. The output of the linear amplifier 64 is received by a threshold circuit 66 which has a response threshold which is established to reject system noise and low amplitude signals so as to provide an acceptable false alarm rate. For a given threshold setting, the probability of a false alarm decreases as the receiver gain is reduced. The output of the threshold circuit 66 is received by an analogue-to-digital converter 68 which provides a train of constant area pulses at a frequency equal to the detected doppler frequency. The output of the analogue to-digital converter is received by an integrator 70 which provides an output signal upon the occurrence of a sufficient number of pulses during a given time period which occurrence indicates that it is likely that an intrusion has occurred. In practice, the system probability of detection is approximately 99.9 percent. The output of the integrator 70 is delivered to a relay drive 72 which provides an output signal of sufficient magnitude to drive an output relay 74. The output relay 74 is connected to an alarm 76 or other means for indicating the presence of an intruder.

In view of the above, it will be appreciated that the intrusion detection system 10 utilizes a relatively straightforward microwave circuit which is exceptionally compact and may be inexpensively fabricated since the structural components thereof may be machined by an automatic screw machine. Moreover, the intrusion detection system 10 is versatile since the transmission/reception pattern may be readily modified for adaptation to surveillance areas of various configurations.

It will be appreciated by those skilled in the art that the preferred embodiment of the invention disclosed herein is susceptible to modification, variation and change without departing from the proper scope or fair meaning of the subjoined claims.

What is claimed is:

1. An intrusion detecting system comprising:
antenna means for receiving electromagnetic energy including a reflector, a dielectric member having an exposed end surface for removably supporting at least one of a plurality of interchangeable antenna elements of thin metallic material on said end surface and at least partially covering said end surface having a configuration which is the part of or the whole of a circular configuration in a location relative to said reflector so that said received electromagnetic energy is directed by said reflector to said one antenna element, said reflector cooperating with any one of said interchangeable antenna elements for providing a reception pattern of predetermined configuration with the predetermined configuration provided by respective ones of said interchangeable antenna elements substantially differing each from the other to thereby provide substantially differing areas of surveillance of said intrusion detecting system; and means associated with said antenna means for detecting a low frequency component of said received electromagnetic energy for providing an output signal which is indicative of an intrusion.

2. An intrusion detecting system according to claim 1 further including means associated with said antenna means for generating electromagnetic energy for radiation of said generated electromagnetic energy from said antenna means, and wherein said antenna means is provided with a radiation pattern of the predetermined configuration of said reception pattern by said at least one antenna element.

3. An intrusion detecting system according to claim 2 wherein said electromagnetic energy received by said antenna is within the microwave range.

4. An intrusion detecting system according to claim 3 wherein said one antenna element has a full solid circular configuration.

5. An intrusion detecting system according to claim 3 wherein said one antenna element has a configuration which is a portion of a solid circle.

6. An intrusion detecting system according to claim 3 wherein said one antenna element is at least partially defined by inner and outer concentric circles.

7. An intrusion detecting system according to claim 6 wherein said one antenna element is wholly defined by said inner and outer concentric circles.

8. An intrusion detecting system according to claim 1 wherein said electromagnetic energy received by said antenna is within the microwave range.

9. An intrusion detecting system according to claim 1 wherein said reflector is a dish-type reflector and said one antenna element is a splash plate associated with said dish-type reflector.

10. An intrusion detecting system according to claim 9 wherein said dish-type reflector includes a portion which is substantially parabolic.

11. An intrusion detecting system according to claim 1 wherein said one antenna element has a full solid circular configuration.

12. An intrusion detecting system according to claim 1 wherein said one antenna element has a configuration which is a portion of a solid circle.

13. An intrusion detecting system according to claim 1 wherein said one antenna element is at least partially defined by inner and outer concentric circles.

14. An intrusion detecting system according to claim 13 wherein said one antenna element is wholly defined by said inner and outer concentric circles.

15. An intrusion detecting system according to claim 1 wherein said metallic sheet is removably affixed to said dielectric member.

16. An intrusion detecting system according to claim 1 wherein said splash plate is affixed to said dielectric member by an adhesive.

17. An intrusion detecting system comprising:
antenna means including a reflector substantially aligned with an axis for reflecting electromagnetic energy, at least one of a plurality of interchangeable antenna elements, at least one of said antenna elements including a portion which is aligned with said axis, and a dielectric member having a side surface generally parallelly aligned with said axis for supporting each of said plurality of interchangeable elements in cooperative position with respect to said reflector for receiving electromagnetic energy reflected by said reflector, at least one of said interchangeable elements being supportable on said side surface, each of said interchangeable antenna elements providing a reception pattern of predetermined configuration with the predetermined configuration provided by respective ones of said interchangeable antenna elements substantially differing each from the other to thereby provide substantially differing areas of surveillance of said intrusion detecting system; and means associated with said antenna means for detecting a low frequency component of said received electromagnetic energy for providing an output signal which is indicative of an intrusion.

18. An intrusion detecting system comprising:
antenna means for receiving electromagnetic energy including a reflector aligned with an axis, means having a cylindrical surface for removably supporting a pair of antenna elements substantially aligned with said axis and in a location relative to said reflector so that said received electromagnetic energy is directed by said reflector to said pair of antenna elements, said pair of antenna elements having at least partially a cylindrical configuration in accordance with said cylindrical surface, said reflector cooperating with said pair of antenna elements for providing a reception pattern of predetermined configuration; and means associated with said antenna means for detecting a low frequency component of said received electromagnetic energy for providing an output signal which is indicative of an intrusion.

19. An intrusion detecting system according to claim 18 wherein said pair of antenna elements are diametrically disposed with respect to said cylindrical surface.

20. An intrusion detecting system comprising:
antenna means including a dish-type reflector which is aligned with an axis for reflecting electromagnetic energy, at least one of a plurality of interchangeable splash plate antenna elements associated with said dish-type reflector which essentially consists of at least one thin metallic sheet, said one having first and second splash plates defining portions of a cylindrical surface, and a dielectric member for supporting each of said plurality of interchangeable elements in cooperative position with respect to said reflector for receiving electromagnetic energy reflected by said reflector, each of said interchangeable antenna elements providing a reception pattern of predetermined configuration with the predetermined configuration provided by respective ones of said interchangeable antenna elements substantially differing each from the other to thereby provide substantially differing areas of surveillance of said intrusion detecting system, at least one of said antenna elements including first and second portions which are aligned with said axis;

means associated with said antenna means for generating electromagnetic energy for radiation of said generated electromagnetic energy from said antenna means, and wherein said antenna means is provided with a radiation pattern of the predetermined configuration of said reception pattern by said at least one antenna element; and means associated with said antenna means for detecting a low frequency component of said received electromagnetic energy for providing an output signal which is indicative of an intrusion.

21. An intrusion detecting system according to claim 20 wherein said reflector is aligned with an axis, and said first-mentioned splash plate and said second splash plate are aligned with said axis and are diametrically disposed with respect to said defined cylindrical surface.

22. An intrusion detectings system according to claim 21 wherein said first-mentioned splash plate and said second splash plate have a rectangular configuration.

* * * * *